(12) United States Patent
Bae et al.

(10) Patent No.: US 9,990,493 B2
(45) Date of Patent: Jun. 5, 2018

(54) DATA PROCESSING SYSTEM SECURITY DEVICE AND SECURITY METHOD

(71) Applicant: SOFTCAMP CO., LTD., Seoul (KR)

(72) Inventors: Steve Bae, Gyeonggi-do (KR); Ki-Chul Son, Gyeonggi-do (KR)

(73) Assignee: SOFTCAMP CO., LTD., Seoul (KR)

( * ) Notice: Subject to any disclaimer, the term of this patent is extended or adjusted under 35 U.S.C. 154(b) by 106 days.

(21) Appl. No.: 14/889,372

(22) PCT Filed: Mar. 31, 2014

(86) PCT No.: PCT/KR2014/002742
§ 371 (c)(1),
(2) Date: Nov. 5, 2015

(87) PCT Pub. No.: WO2014/185627
PCT Pub. Date: Nov. 20, 2014

(65) Prior Publication Data
US 2016/0078227 A1    Mar. 17, 2016

(30) Foreign Application Priority Data

May 15, 2013    (KR) .................. 10-2013-0055128

(51) Int. Cl.
| | |
|---|---|
| *G06F 21/56* | (2013.01) |
| *G06F 11/30* | (2006.01) |
| *G06F 21/50* | (2013.01) |
| *G06F 21/52* | (2013.01) |
| *G06F 21/62* | (2013.01) |

(52) U.S. Cl.
CPC .............. *G06F 21/56* (2013.01); *G06F 11/30* (2013.01); *G06F 21/50* (2013.01); *G06F 21/52* (2013.01); *G06F 21/566* (2013.01); *G06F 21/6209* (2013.01)

(58) Field of Classification Search
CPC .... G06F 21/566; G06F 11/30; G06F 21/6209; G06F 21/52; G06F 21/56; G06F 21/50
See application file for complete search history.

(56) References Cited

U.S. PATENT DOCUMENTS 5,974,549 A * 10/1999 Golan ..................... G06F 9/468
714/47.3

FOREIGN PATENT DOCUMENTS

| KR | 1020090082176 | 7/2009 |
| KR | 1020100100488 | 9/2010 |
| KR | 1020110106104 | 9/2011 |
| KR | 1020120093564 | 8/2012 |

\* cited by examiner

*Primary Examiner* — Brandon S Hoffman
*Assistant Examiner* — Nega Woldemariam
(74) *Attorney, Agent, or Firm* — IPLA P.A.; James E. Bame (57) ABSTRACT

Provided is a security device and method that protect a data processing system from various types of malicious code and prevent the divulgence of data and erroneous operation. The security device for a data processing system includes: an execution module configured to be called by a security loader when a stub file, including a security loader formed in a routine form and a stub composed of an original executable file, is executed, and to perform processing so that the original executable file restored from the stub by the security loader is executed; and a monitoring module configured to monitor the operation of the data processing system attributable to the execution of the restored original executable file.

3 Claims, 6 Drawing Sheets

DATA PROCESSING SYSTEM SECURITY DEVICE AND SECURITY METHOD

BACKGROUND

The present invention relates to a security device and method that protect a data processing system from various types of malicious code and prevent the divulgence of data and erroneous operation.

With the development of data processing systems, such as computers, mobile terminals, etc., that operate and manage various types of data and with the development of networks, such as the Internet, that mediate mutual communication, a massive amount of data is being handled via data processing systems.

Such data includes not only information useful to users but also information malicious to users. The information malicious to users may include malicious code, such as viruses, spyware, adware, etc., as an example. The malicious code may fatally damage a data processing system that is being used by a specific user or a plurality of unspecified users, may cause operations undesirable to a user to be performed, and, furthermore, may divulge the private information of a user and thus may cause economic damage to the corresponding user. Accordingly, efforts to continuously monitor and block such malicious code have been continuously made.

Conventionally and generally, to search for malicious code, the patterns of a plurality of types of malicious code are previously stored in a database (DB), and it is monitored whether a file having any one of the patterns is present at a specific location of a designated data processing system or network.

However, the conventional method randomly examines stored files and compares them with the patterns stored in the DB, and thus it is problematic in that the level of security is low for invested time and resources. Furthermore, the conventional method randomly monitors the security level of a file regardless of the execution of the corresponding file only when a conventional security device is run, and thus the conventional method is limited in that the conventional security device cannot monitor malicious code that is not activated or is not malicious code itself at a specific point of time and then initiates a malicious function when specific processing is performed or a specific point of time is reached.

In order to overcome these problems, there was proposed a method in which a conventional security device examined all files present in a data processing system or at a specific location at predetermined intervals. However, the number of security target files that must be monitored by the conventional security device is not small due to the size of the data processing system or specific location, and the number of times monitoring is performed increases as the length of the monitoring intervals decreases. Accordingly, in order to perform precise file monitoring, a problem arises in that high-level specifications are required for the conventional security device.

SUMMARY OF THE INVENTION

Accordingly, the present invention has been devised to overcome the above-described problems of the conventional art, and an object of the present invention is to provide a security device and method for a data processing system, which can efficiently perform the monitoring of an executable file that induces the operation of malicious code.

In order to accomplish the above object, the present invention provides a security device for a data processing system, including:

an execution module configured to be called by a security loader when a stub file, including a security loader formed in a routine form and a stub composed of an original executable file, is executed, and to perform processing so that the original executable file restored from the stub by the security loader is executed; and a monitoring module configured to monitor the operation of the data processing system attributable to the execution of the restored original executable file.

Furthermore, in order to accomplish the above object, the present invention provides a security method for a data processing system, including:

a security device installation determination step of calling, by a security loader of a stub file inside the data processing system, a security device of the data processing system when the stub file is executed;

a target file information storage step of restoring an original executable file from a stub of the stub file and storing the restored original executable file; and an original executable file monitoring step of monitoring the operation of the data processing system attributable to execution of the restored original executable file.

The above-described present invention has the effects of increasing the efficiency of the monitoring of malicious code and operating efficiency, and also minimizing a system load during monitoring operation because a security device that monitors the operation of malicious code included in an executable file is passively run and operated during the execution of the executable file.

DETAILED DESCRIPTION OF THE INVENTION

The features and effects of the above-described present invention will be more apparent from the following detailed description take in conjunction with the accompanying drawings, and, accordingly, those having ordinary knowledge in the technical field to which the present invention pertains can easily practice the technical spirit of the present invention. Although the present invention may be subjected to various modifications and various forms, specific embodiments will be illustrated in the drawings and will be described in the following description in detail. However, this is not intended to limit the present invention to specific disclosed forms, but it should be appreciated that the present invention includes all modifications, equivalents and substitutions included in the spirit and technical scope of the present invention. The terms used herein are used merely to describe specific embodiments, and are not intended to limit the present invention.

Hereinafter, specific content for practicing the present invention will be described in detail with reference to the accompanying drawings.

Figure 1:
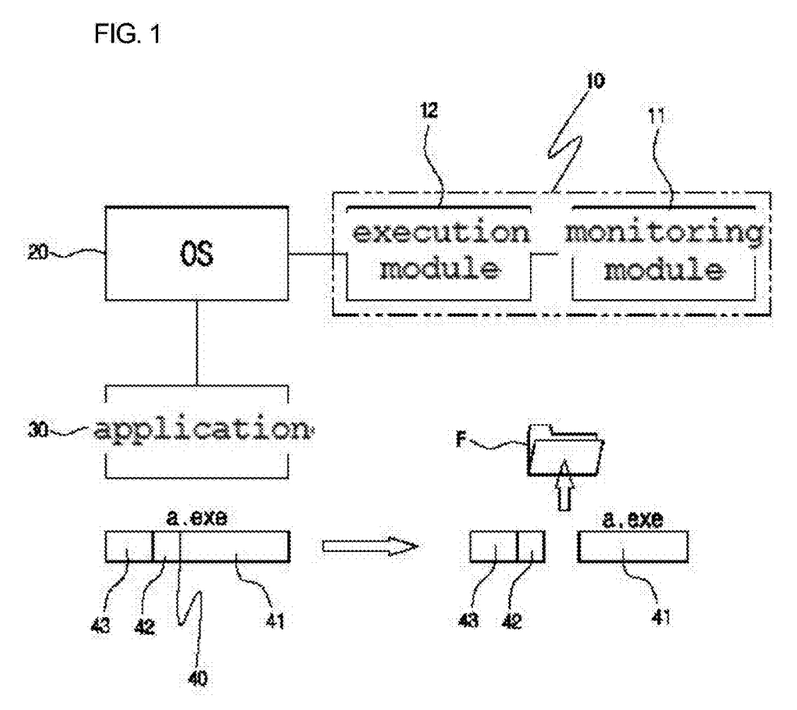
FIG. 1 is a diagram schematically showing a structure of a security device according to the present invention.

FIG. 1 is a diagram schematically showing the structure of a security device according to the present invention, and the following description will be given with reference to this drawing.

The security device 10 according to the present invention includes: a monitoring module 11 configured to detect activity occurring in a specific area during the execution of a stub file 40 and block and/or warn of the corresponding activity when the corresponding activity departs from designated activity; and an execution module 12 configured to process a security-processed stub file 40 so that the security-processed stub file 40 is restored to its original executable file and then executed.

The monitoring module 11 detects activity related to data generation or editing in areas, such as the registry, file I/O, service, window, and kernel area drive areas and the like of a data processing system, during the execution of the stub file 40, more specifically during the execution of the original executable file configured in the stub file 40. Thereafter, when the access of an application unrelated or related to the corresponding original executable file configured in the stub file 40 or execution whose operation has not been authorized is detected, the monitoring module 11 forcibly stops the access or execution, or notifies a user of the access or execution by outputting a warning window. The access of an application unrelated or related to a corresponding original executable file or execution whose operation has not been authorized refers to the performance of an operation, unrelated to an original executable file or stub file 40, in an arbitrary area by malicious code illegitimately recorded in the corresponding original executable file or stub file 40, or refers to a change (generation, modification, deletion or the like) to an area (a registry, file I/O, service, or the like) that may influence the operation of a system. For reference, well-known, commonly used vaccine program technology is applied to the monitoring module 11 that monitors the activity of malicious code, and the corresponding technology includes a technology for forcibly stopping unauthorized execution or outputting a warning window when the unauthorized execution is detected. The execution module 12 is passively called and executed in response to the execution of the stub file 40, and performs processing so that a security loader 43 configured in the stub file 40 can be operated according to a program, thereby enabling the stub 41 of the stub file 40 to be restored to its original executable file. That is, the execution module 12 is a component that performs processing so that the security loader 43 is executed according to a set program routine.

The stub file 40 includes: a stub 41 composed of an original executable file; a header 42 adapted to have information about a generator who generated the stub file 40 and/or information about a generated system; and a security loader 43 configured to call the security device 10 while controlling processing for the execution of the original executable file. To allow configuration data to be processed in a streaming manner, the security loader 43, the header 42 and the stub 41 are sequentially arranged such that they can be sequentially processed in a corresponding OS and the application 30. As a result, the security loader 43 is a type of routine that is programmed to actively notify the security device 10 of the execution of the stub file 40 and to perform the restoration of the stub 41, i.e., corresponding original data, while operating in conjunction with the execution module 12 configured in the security device 10. For reference, the execution module 12, i.e., one component of the security device 10, is a device that receives the location of the restored original executable file from the security loader 43 and performs control so that the original executable file is executed.

The technology of the security device 10 according to the present embodiment is described in greater detail when a security method is described below.

Figure 2:
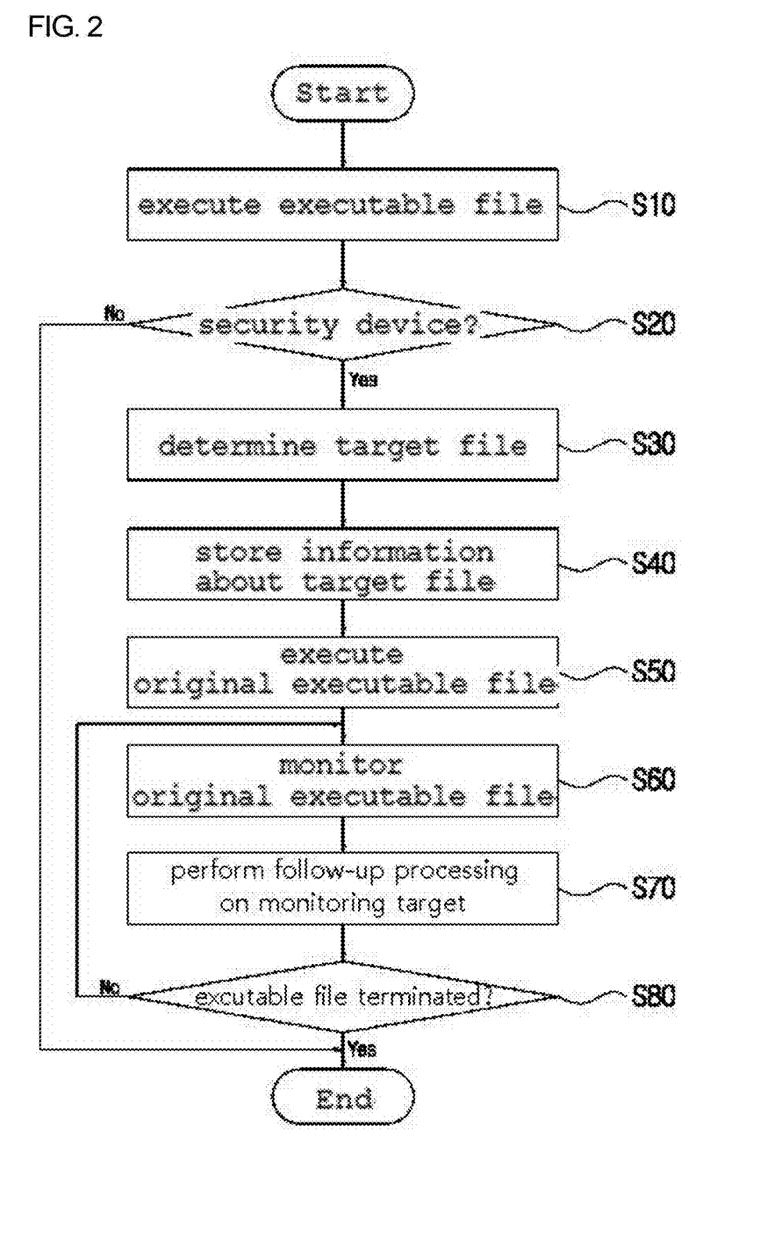
FIG. 2 is a flowchart sequentially showing a security method that is performed based on the security device according to the present invention.

FIG. 2 is a flowchart sequentially showing a security method that is performed based on the security device according to the present invention, and the following description will be given with reference to this drawing.

S10: Executable File Execution Step

An executable file for driving a data processing system or application 30 is executed in the corresponding system in accordance with the selection of a user or a set flow. In this case, the executable file is a file having a Portable Executable (PE) structure, such as *.exe, *.dll, or the like. In addition to these, the executable file may include executable files having various extensions.

For reference, since the name of the stub file 40, i.e., a target for the present invention, is stored in the same form as the name of its original executable file, an Operating System (OS) 20 or application 30 that executes the original executable file determines the stub file 40, recognized as an executable file, using its corresponding original executable file, and performs the execution thereof. Accordingly, when an original executable file is "a.exe," the stub file 40 is also converted into "a.exe" and then stored, and thus the OS 20 or corresponding application 30 processes the execution of "a.exe" converted into and stored as the stub file 40 at the time when the corresponding executable file has to be processed.

Thereafter, information recorded in the executable file is sequentially processed in a streaming manner by the OS 20 or application 30. Accordingly, when the executable file is the stub file 40, the OS 20 or application 30 processes the security loader 43, the header 42, and the stub 41, i.e., the information recorded in the stub file 40, in the order in which they have been stored.

S20: Security Device Installation Determination Step

The security loader 43 is detected during the processing process of the OS 20 or application 30, and the security loader 43 calls the security device 10 while operating according to set content.

In contrast, when the executable file is a general executable file other than the stub file 40 security-processed according to the present invention, the security loader 43 has not been configured in the corresponding executable file. Accordingly, during the processing of the OS 20 or application 30, the security device 10 is not called, and the stub 41 of the executable file is directly executed by the corresponding application.

For reference, when the stub file 40 is executed in a data processing system in which the security device 10 according to the present invention has not been installed, the security loader 43 of the stub file 40 does not have a target for calling, and thus a subsequent procedure is not performed. As a result, since the execution itself of a monitoring target executable file is fundamentally blocked in the data processing system in which the security device 10 has not been installed, the effect of maximizing security is achieved.

S30: Target File Determination Step

The security loader 43, i.e., a type of program routine, determines first full path information used to determine the location of the stub file 40, and also determines the sizes of the security loader 43, the header 42, and the stub 41 configured in the stub file 40. Since the stub file 40 is an independent file that may be moved to and executed at various locations according to the intention of a user, the stub file 40 is not fixedly located at a specific location in a limiting manner. Accordingly, the security loader 43 determines its on location and size whenever the stub file 40 is executed. For reference, the full path information is made by designating and inputting a drive name and all directory names when a file name is designated, and is well-known, commonly used information used to determine the absolute location of a file.

The stub 41 is an original executable file section, and the original executable file section may be encrypted when it is converted into the stub file 40. As a result, in the case where the original executable file has been converted into the stub file 40, when the original executable file is executed, effects occur due to the encryption of the original executable file in that the activity of malicious code is fundamentally blocked and also the data of an original executable file is prevented from being illegitimately divulged.

S40: Target File Information Storage Step

The security loader 43 separately stores the original executable file of the stub 41 in a temporary folder F, determines second full path information, i.e., the location of the corresponding temporary folder F, and transfers the second full path information, along with the first full path information, to the execution module 12 of the security device 10.

For reference, when the original executable file of the stub 41 has been encrypted, the security loader 43 may decrypt the encrypted original executable file and then may store the decrypted original executable file in the temporary folder F, or the security loader 43 may store the encrypted original executable file in the temporary folder F first and the execution module 12 may decrypt the encrypted original executable file immediately before the execution of the corresponding original executable file.

S50: Original Executable File Execution Step

The execution module 12 of the security device 10 called by the security loader 43 receives the second full path information from the security loader 43, and the execution module 12 performs processing so that the original executable file corresponding to the second full path information is executed.

The original executable file initiates corresponding unique execution under the control of the execution module 12, and an associated application initiates its running.

S60: Original Executable File Monitoring Step

The monitoring module 11 of the security device 10 determines the original executable file in the temporary folder F based on the first and second path information transmitted by the security loader 43. When the original executable file is executed, the monitoring module 11 of the security device 10 determines all data generated or edited in the registry, file I/O, service, window and kernel area drive areas and the like of the data processing system, and determines whether malicious code is present or whether unauthorized behavior has occurred.

The monitoring module 11 has execution information after the operation of the original executable file. Accordingly, when an operation, other than those of designated execution information, occurs after the operation of the original executable file, the monitoring module 11 considers that malicious code or unauthorized behavior has occurred in a corresponding area of the data processing system, and then takes follow-up measures.

S70: Monitoring Target Follow-Up Processing Step

If it is determined that malicious code or unauthorized behavior has occurred in the corresponding area of the data processing system, the monitoring module 11 may stop the corresponding operation of the data processing system, or may output a warning window to the user, thereby enabling the user to take follow-up measures.

An example of the details of the follow-up processing of the monitoring module 11 includes data generation or editing, such as the monitoring of an attempt to make a change to an area (an MBR or the like) required for the booting of an OS (file monitoring), the monitoring of an attempt to make an unnecessary change to a registry value in a kernel level other than a general user level (registry monitoring), or the storage of the log of a part whose access is blocked or is requested to be blocked.

As described above, a well-known, commonly used device for limiting the running of malicious code or unauthorized behavior may be employed as the monitoring module 11.

Meanwhile, the stub file 40 includes the header 42, and the monitoring module 11 determines the header information of the stub file 40 in the header 42. The header information includes information about a generator who generated the stub file 40 and/or information about a place where the stub file 40 was generated, a file incoming path (hereinafter "file incoming path information"), etc. Based on the header information, the execution of the stub file 40 may be controlled, or security measures, such as deletion, may be taken.

More specifically, the monitoring module 11 searches for the file incoming path information (for example, the mail address of a sender who sent the file, a URL address from which the file was downloaded, the name of a USB device including the file, or the like) of the corresponding stub file 40 based on the header information of the stub file 40 first at the original executable file monitoring step S70. If the found file incoming path information corresponds to an incoming path that was unauthorized in terms of policies because it was previously determined that malicious code was run or unauthorized behavior was performed via the incoming path, it may be possible to perform follow-up processing for blocking the execution of the corresponding original executable file, deleting the stub file 40, or limiting the operation of another stub file having the file incoming path information so that the corresponding file incoming path itself can be blocked.

S80: Executable File Termination Step

Once the execution of the corresponding executable file has been terminated, the execution module 12 deletes the temporary folder F, in which the original executable file was temporarily stored, or the original executable file.

Figure 3:
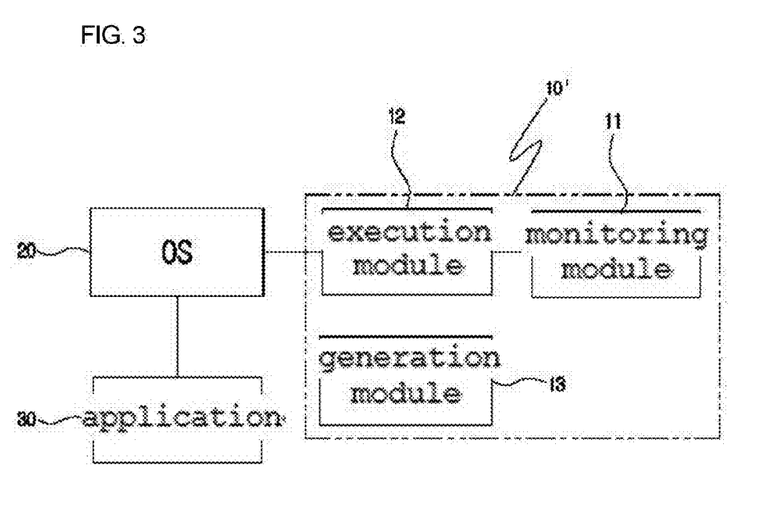
FIG. 3 is a block diagram schematically showing another structure of the security device according to the present invention.
Figure 4:
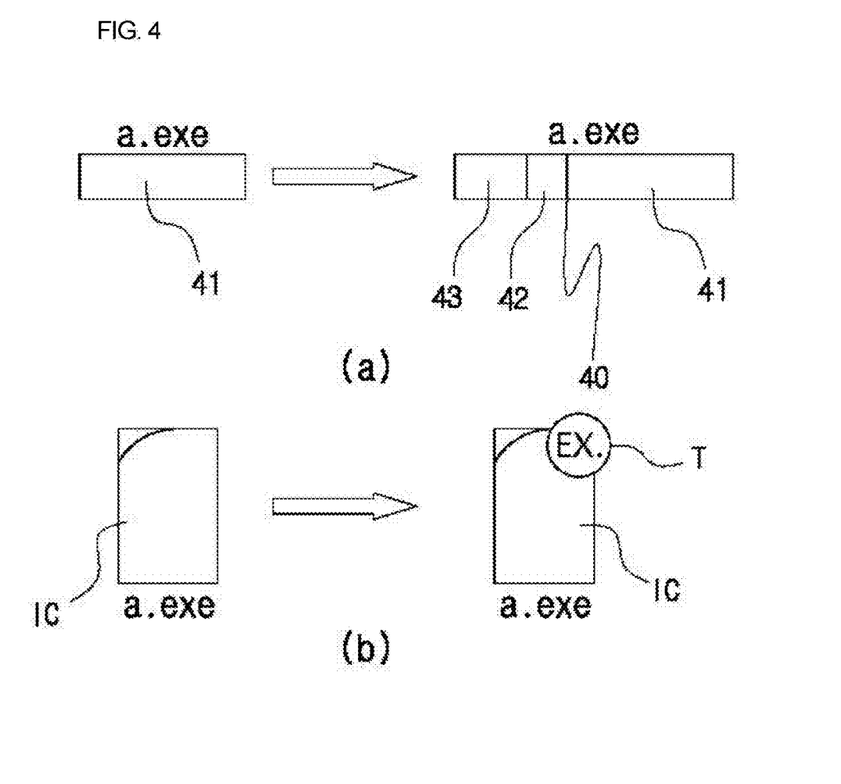
FIG. 4 is a diagram showing the shape and icon of an original executable file converted into a stub file via the security device according to the present invention.
Figure 5:
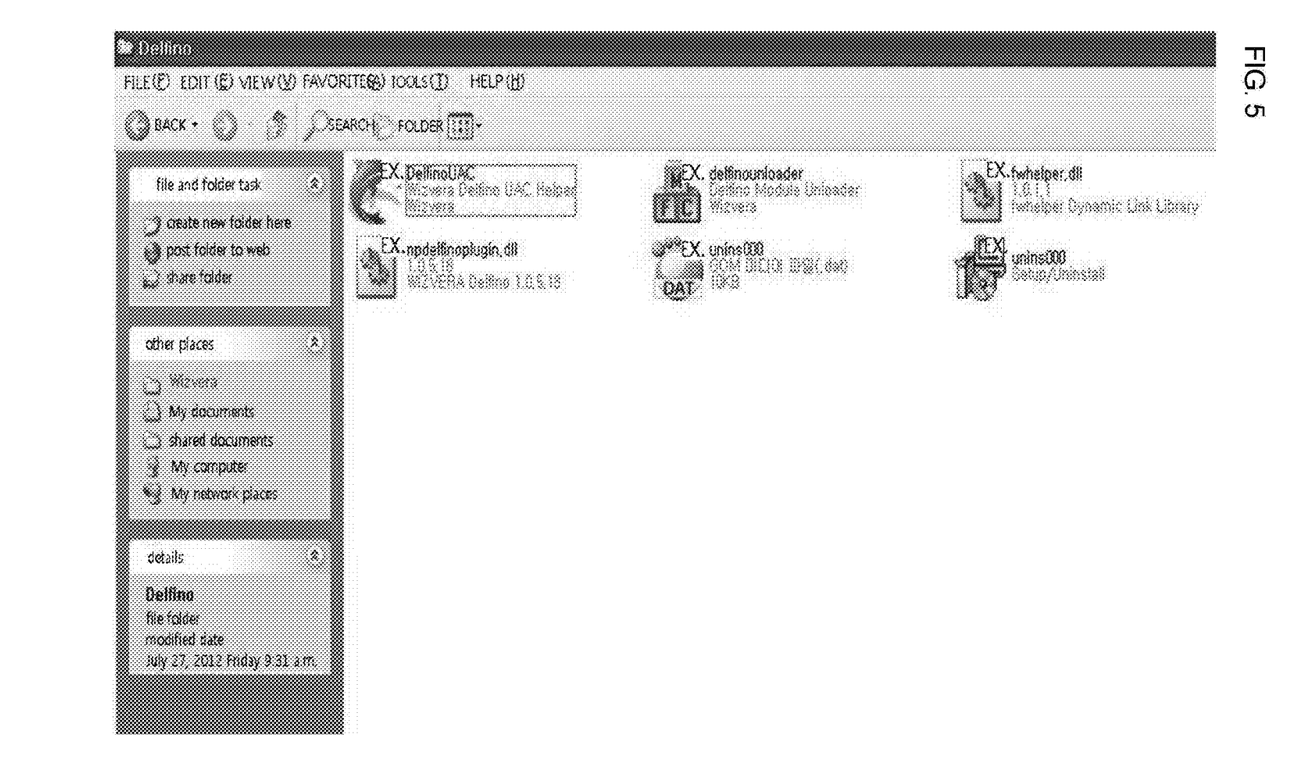
FIG. 5 is a diagram showing an icon image of a stub file according to the present invention.

FIG. 3 is a block diagram schematically showing another structure of the security device according to the present invention, FIG. 4 is a diagram showing the shape and icon of an original executable file converted into a stub file via the security device according to the present invention, and FIG. 5 is a diagram showing an icon image of a stub file according to the present invention, and the following description will be given with reference to these drawings.

A security device 10' according to the present invention further includes a generation module 13 configured to convert a monitoring target original executable file into a stub file 40.

Among executable files, an executable file of an application whose security must be must be maintained is present. Accordingly, security is a prerequisite for the operation of the corresponding application. For this purpose, it must be monitored in real time whether malicious code performs activity while the executable file of the application is being run. Accordingly, the security device 10' according to the present invention includes the generation module 13 configured to convert a designated original executable file into the stub file 40.

Meanwhile, some executable files execute a new program while additionally generating and executing a subordinate executable file during execution. As an example, when the user executes an executable file, such as a program install file, the corresponding executable file additionally generates a subordinate executable file, and allows the subordinate executable file to be automatically executed or the user to selectively execute the subordinate executable file.

Accordingly, when a main executable file has been converted into the stub file 40, the generation module 13 performs processing so that a subordinate executable file that is generated when the corresponding stub file 40 is executed is also automatically converted into a stub file.

As shown FIG. 4(*a*), the generation module 13 generates the security loader 43 for the purpose of converting into the stub file 40, and inserts the security loader 43 into the front end of the original executable file, i.e., a conversion target, so that the original executable file is converted into the stub file 40. As a result, the generation module 13 performs conversion into the stub file 40 by disposing the security loader 43 in front of the stub 41 corresponding to the original executable file.

Technology for inserting a security loader into an original executable file is described in greater detail.

Inserting the security loader 43, i.e., a stub program, into an original executable file or adding the security loader 43 and data all correspond to the task of adding data to an executable file. Methods of adding an executable file and data as described above are various. The following are given as examples in embodiments according to the present invention.

(1) First Embodiment

The security loader 43 is added to a resource. This method is a method that is used during compile time, and is wildly used in the execution module 13 that generates a stub program corresponding to the security loader 43. An original executable file itself is included in a binary resource, and then the binary resource is loaded and used. When a resource API that is provided by Windows is used, this task can be easily performed. Since the resource, together with the original executable file, is loaded onto memory, the waste of memory may occur when the size of the security loader 43 added to the resource is large and it is not necessary to load them at one time.

(2) Second Embodiment

A new section is added to the original executable file, and the security loader 43 is added thereto. A method of adding a section may be used both during compile time and after compile. To add a section during compile time, #pragma data_seg is used. To add a section to the complete stub file 40, a separate utility has to be generated. The most significant advantage of this method is that executable code can be added. In contrast, this method has a disadvantage in that the addition of a section to the stub file 40 has to be implemented personally because there is no supporting API. Since the section is loaded onto memory like the resource, the problem of the waste of memory still remains.

Thereafter, once the conversion into the stub file 40 has been completed, the generation module 13 stores icon image information marked with a marker in the resource of the stub file 40, through which the icon image marked with the marker is posted and thus the user can identify it. The stub file 40 is obtained through conversion for the purpose of monitoring an original executable file, i.e., a type of executable file. Since the file name of the stub file 40 is the same as that of the original executable file, the icon image of the stub file 40 must be also the same as the icon image of the original executable file. Accordingly, to enable the user to identify this, the icon image IC of the stub file 40 obtained through conversion is marked with the marker "examined" T using an overlay method or the like, as shown in FIG. 4(*b*). FIG. 5 is a diagram showing an example of the icon image of the stub file 40 marked with the marker. The user can immediately identify an original executable file converted into the stub file 40 while viewing the icon image output onto the corresponding folder, through which a secure tasking environment can be ensured.

Figure 6:
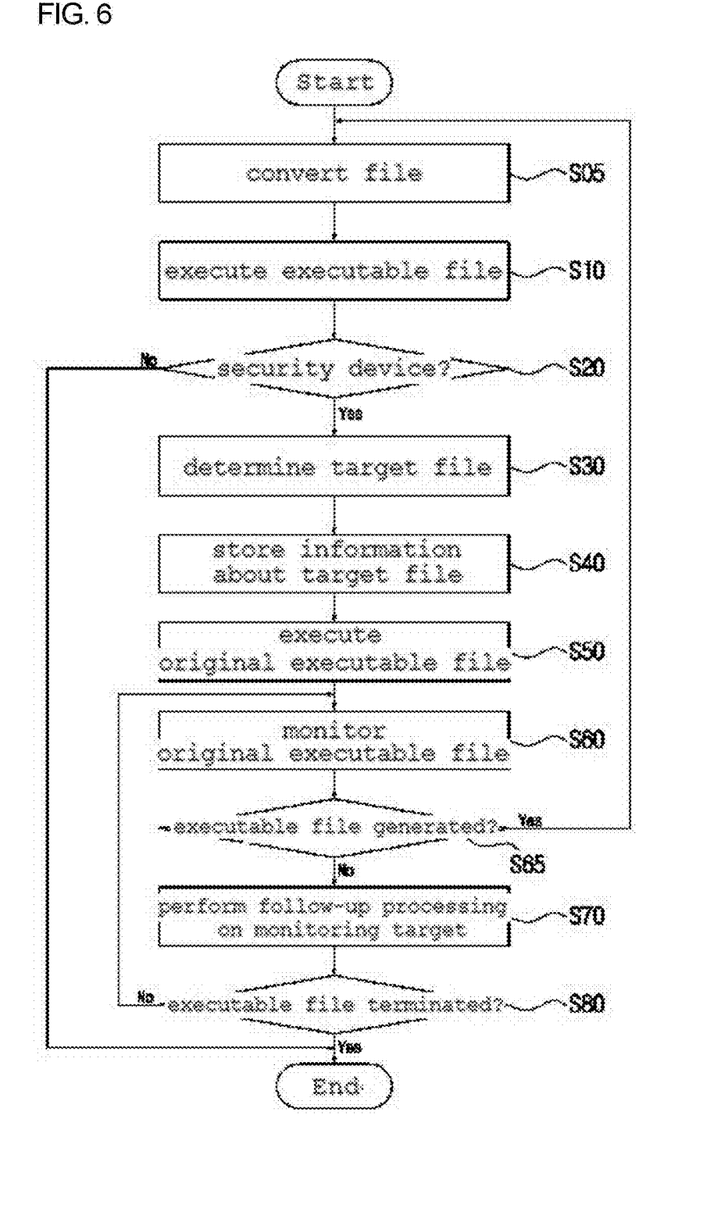
FIG. 6 is a flowchart sequentially showing another embodiment of a security method that is performed based on the security device according to the present invention.

FIG. 6 is a flowchart sequentially showing another embodiment of a security method that is performed based on the security device according to the present invention.

S05: Conversion-Into-Stub File Step

When a new executable file is input to a data processing system or a specific application is selected as a monitoring target, the generation module 13 of the security device 10' inserts the security loader 43, i.e., a type of program routine, into an original executable file, i.e., the executable file, in order to convert the executable file or the executable file of a specific application into a monitoring target, thereby converting the original executable file into the stub file 40.

The forms in which a new executable file is input to a data processing system may include transmission via a file attached to an email or the like (download), transmission a movable disk, such as USB memory, a compact disk (CD) or the like, etc. Furthermore, the forms in which a specific application is set as a monitoring target may include the installation of an application for online banking, online payment, or the like, etc.

In addition, a new executable file may be input to a data processing system by an executable file that is newly generated while the user is executing an install file.

Since an executable file execution step S10, a security device installation determination step S20, a target file determination step S30, a target file information storage step S40, an original executable file execution step S50, an original executable file monitoring step S60, and a monitoring target follow-up processing step S70 are the same as or similar to the above-described corresponding steps, redundant descriptions of the corresponding steps are omitted.

S65: Executable File Generation Determination Step

The generation module 13 of the security device 10' determines whether a new executable file has been generated when the original executable file is execution. As described above, the executable file includes an executable file that generates a new executable file, such as an install file, and thus the generation module 13 determines whether a new executable file has been generated and then performs conversion-into-stub file step S05.

It will be apparent that if it is determined that there is no newly generated executable file, the monitoring of the execution of the original executable file is resumed or the executable file is terminated.

Although the above description has been given with reference to the preferred embodiments of the present invention in the above detailed description of the present invention, it will be understood by those skilled in the corresponding technical field or those having ordinary knowledge in the corresponding technical field that the present invention may be modified and altered in various manners within the range that does not depart from the spirit and technical scope of the present invention that are described in the following claims.

DESCRIPTION OF REFERENCE NUMERALS 10, 10': security device 11: monitoring module 12: execution module 13: generation module 20: OS 30: application 40: stub file 41: stub 42: header 43: security loader

The invention claimed is:

1. A security method for a data processing system, the security method comprising:
    a security device installation determination step of, when a stub file, which includes a stub formed by encrypting an original executable file having a portable executable (PE) structure, a header adapted to store generation information and incoming path information of the stub file, and a security loader formed as a program routine for calling a security device while controlling execution of the original executable file and which has a file name and an extension identical to those of the original executable file, is executed by an OS or application installed on a data processing system, calling, by the security loader of the stub file, the security device installed in the data processing system;
    a target file determination step of determining, by the security loader, first full path information which is location information of the stub file;
    a target file information storage step of storing, by the security loader, the encrypted original executable file in a temporary folder, transferring, by the security loader, the first full path information, together with second full path information which is location information of the temporary folder F, to the security device, and restoring, by the security device, the original executable file from the temporary folder corresponding to the second full path information;
    a new stub file generation step of, when a new original executable file generated by the execution of the original executable file is detected, combining or inserting the security loader with or into the new original executable file to thus convert the new original executable file into a new stub file; and
    a monitoring target follow-up processing step of, when the restored original executable file is executed by the corresponding application, determining, by the security device, data generated and edited in the data processing system, and determining, by the security device, whether a malicious code is present or not and whether an unauthorized action has occurred or not.

2. The security method of claim 1, further comprising, after the original executable file monitoring step, an executable file termination step of deleting, by the security device, the restored original executable file when the execution of the original executable file is terminated.

3. The security method of claim 1, wherein the original executable file monitoring step comprises determining, by the security device, file incoming path information in header information of the stub file;
    further comprising, after the original executable file monitoring step, a monitoring target follow-up processing step of examining, by the security device, data generated or edited during the execution of the restored original executable file, stopping the execution of the original executable file or outputting a warning window when generation or editing of unauthorized data is determined, and limiting an operation of another stub file having the file incoming path information.

* * * * *